United States Patent
Flick

(10) Patent No.: US 8,362,886 B2
(45) Date of Patent: Jan. 29, 2013

(54) MULTI-CONTROLLER DATA BUS ADAPTOR AND ASSOCIATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 645 days.

(21) Appl. No.: 11/861,693

(22) Filed: Sep. 26, 2007

(65) Prior Publication Data

US 2009/0079552 A1  Mar. 26, 2009

(51) Int. Cl.
 *B60R 25/10* (2006.01)
(52) U.S. Cl. ............. 340/426.17; 340/12.22; 340/12.52; 340/12.53; 340/12.23; 340/5.22; 340/5.61; 340/5.64; 701/1; 701/2; 710/104; 710/112; 710/315; 370/466; 455/41.2; 455/345
(58) Field of Classification Search .............. 340/426.17, 340/12.22, 12.23, 12.52, 12.53, 5.22, 5.61, 340/5.64; 701/1, 2; 710/104, 112, 315; 370/456; 455/41.2, 345
See application file for complete search history.

(56) References Cited

U.S. PATENT DOCUMENTS

| | | | |
|---|---|---|---|
| 4,383,242 A | 5/1983 | Sassover et al. ................ 340/64 |
| 5,146,215 A | 9/1992 | Drori ........................ 340/825.32 |
| 5,252,966 A | 10/1993 | Lambropoulos et al. ........................ 340/825.69 |
| 6,346,876 B1 | 2/2002 | Flick ............................ 340/426 |
| 6,373,148 B1 | 4/2002 | Daiss et al. ................... 307/10.5 |
| 6,756,885 B1 | 6/2004 | Flick ........................... 340/426.1 |
| 6,756,886 B2 | 6/2004 | Flick ........................... 340/426.1 |
| 6,853,841 B1* | 2/2005 | St. Pierre ...................... 455/420 |
| 2004/0071097 A1* | 4/2004 | Halter et al. ................... 370/257 |
| 2005/0024255 A1* | 2/2005 | Chuey ........................... 341/176 |
| 2008/0172506 A1* | 7/2008 | Ellerbrock et al. ........... 710/104 |

OTHER PUBLICATIONS

Omega Research and Development, Inc., *Operating & Installation Instructions*, "Comfort Start," copyright: Omega Research & Development 2003, pp. 1-40.
"Modular Advanced Remote Start," Omega Research and Development, Inc., Aug. 23, 2007, pp. 1-2, available at www.caralarm.com.
"IntelliKit—Upgradeable Vehicle Interface Kits," Omega Research and Development, Inc., Aug. 23, 2007, pp. 1-2, available at www. caralarm.com.

* cited by examiner

*Primary Examiner* — George Bugg
*Assistant Examiner* — Ojiako Nwugo
(74) *Attorney, Agent, or Firm* — Allen, Dyer, Doppelt, Milbrath & Gilchrist, P.A.

(57) ABSTRACT

A remote control system for a vehicle of a type including a data communications bus extending throughout the vehicle and connecting a plurality of vehicle devices within the vehicle may include a remote transmitter and a vehicle remote function controller being responsive to the remote transmitter. The vehicle remote function controller may include a controller data link interface. The remote control system may include a multi-controller data bus adaptor for adapting the vehicle remote function controller to communicate via the data communications bus and may include an adaptor data link interface coupled to the controller data link interface. The multi-controller data bus adaptor may be operable with a given set of controller codes for the vehicle remote controller from among a plurality of different sets of controller codes for a plurality of different vehicle function controllers.

17 Claims, 4 Drawing Sheets

MULTI-CONTROLLER DATA BUS ADAPTOR AND ASSOCIATED METHODS

FIELD OF THE INVENTION

The present application is related to the field of control systems, and, more particularly to vehicle control systems and associated methods.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle. The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

In addition to vehicle security and remote keyless entry functions, another type of desirable vehicle remote control function is remotely starting the vehicle engine when the owner is away from the vehicle. Such remote starting can be used in cold climates to warm the engine and/or run the passenger compartment heater, to thereby prevent freezing or for the user's comfort. Conversely, remote engine starting can enable the air conditioning to run to cool the vehicle's interior before the vehicle user enters the vehicle.

Unfortunately, many older vehicle security systems needed to be directly connected by wires to individual vehicle devices, such as the vehicle horn or door switches of the vehicle. In other words, older conventional vehicle security systems were hard-wired to various vehicle components, typically by splicing into vehicle wiring harnesses or via interposing T-harnesses and connectors. More recently, vehicle manufacturers have moved to decrease the wiring complexity by using one or more data buses extending throughout the vehicle and interconnecting various vehicle devices. Moreover, the assignee of the present invention has made a number of significant developments in the vehicle data bus area, particularly as may be helpful to the adaptation of aftermarket vehicle remote control systems to vehicles including a data bus. For example, some of these innovations are disclosed in U.S. Pat. Nos. 6,756,885 and 6,346,876, the entire disclosures of which are incorporated herein by reference.

Indeed one of the significant advances disclosed in the Flick patents is the concept of a multi-vehicle compatible controller that may be provided by using a conventional remote control device coupled to the data bus by a data bus adaptor device. The data bus adaptor device is able to translate the codes or language generated by the vehicle devices on the data bus into a format that may be read by the remote control device, and/or is able to translate command information or codes from the remote control device into data bus codes to control the vehicle devices.

Despite the advances provided by the migration of manufacturers to vehicle data bus technology, and the significant advances provided by the Flick patents for multi-vehicle compatibility with the data bus, there are still other compatibility shortcomings that may need further efforts. In particular, manufacturers of aftermarket security and remote start systems may be using proprietary output formats, such as in the form of coded serial outputs that will interface with their own data bus modules, but not with the data bus modules of other manufacturers.

SUMMARY OF THE INVENTION

In view of the foregoing background, it is therefore an object of the present invention to provide a multi-controller data bus adaptor for a vehicle including a data communications bus.

This and other objects, features, and advantages in accordance with the present invention are provided by a remote control system for a vehicle of a type including a data communications bus extending throughout the vehicle and connecting a plurality of vehicle devices within the vehicle, for example. The remote control system may include a remote transmitter, and a vehicle remote function controller being responsive to the remote transmitter. The vehicle remote function controller may include a controller data link interface. The remote control system may also include a multi-controller data bus adaptor for adapting the vehicle remote function controller to communicate via the data communications bus, for example.

The multi-controller data bus adaptor may include an adaptor data link interface coupled to the controller data link interface. The multi-controller data bus adaptor may be operable with a given set of controller codes for the vehicle remote controller from among a plurality of different sets of controller codes for a plurality of different vehicle function controllers. The data bus adaptor may comprise a download learning port for learning the given set of controller codes, for example. The download learning port advantageously allows several ways for learning the given set of controller codes. Accordingly, the remote control system may provide a multi-controller data bus adaptor for a vehicle including a data communications bus and that can interface to a plurality of different manufacturers' security or remote start devices.

Another advantageous aspect of the remote control system is that the vehicle may operate with a desired set of vehicle device codes from among a plurality of different sets of vehicle device codes for different vehicles. The download learning port may also for learning the desired set of vehicle device codes, for example. In other words, the multi-controller data bus adaptor may also provide multi-vehicle compatibility.

The multi-controller data bus adaptor may further include a processor and a memory coupled thereto for storing the given set of controller codes. To additionally provide multi-vehicle compatibility, the multi-controller data bus adaptor memory may also be for storing a desired set of vehicle device codes from among a plurality of different sets of vehicle device codes for different vehicles.

In other embodiments, the multi-controller data bus adaptor may determine the given set of codes based upon at least one code received from the vehicle function controller. In addition, the data bus adaptor may determine a desired set of vehicle device codes from among a plurality of different sets of vehicle device codes for different vehicles based upon at least one code on the data communications bus, for example.

In still other embodiments, the multi-controller data bus adaptor may also include at least one switch for permitting selecting of the given set of codes. The at least one switch may also be for selecting a desired set of vehicle device codes from among a plurality of different sets of vehicle device codes for different vehicles based upon at least one code on the data communications bus, for example.

The controller data link interface and the adaptor data link interface may establish a serial data communications link therebetween, for example.

A method aspect of the invention is for using a remote control system for a vehicle of a type including a data communications bus extending throughout the vehicle and connecting a plurality of vehicle devices within the vehicle. The remote control system may include a remote transmitter, and a vehicle remote function controller responsive to the remote transmitter and including a controller data link interface. The system may also include a multi-controller data bus adaptor for adapting the vehicle remote function controller to communicate via the data communications bus, for example. The multi-controller data bus adaptor may include an adaptor data link interface coupled to the controller data link interface. The method may further include operating the multi-controller data bus adaptor with a given set of controller codes for the vehicle remote controller from among a plurality of different sets of controller codes for a plurality of different vehicle function controllers.

DETAILED DESCRIPTION OF THE PREFERRED EMBODIMENTS

The present invention will not be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
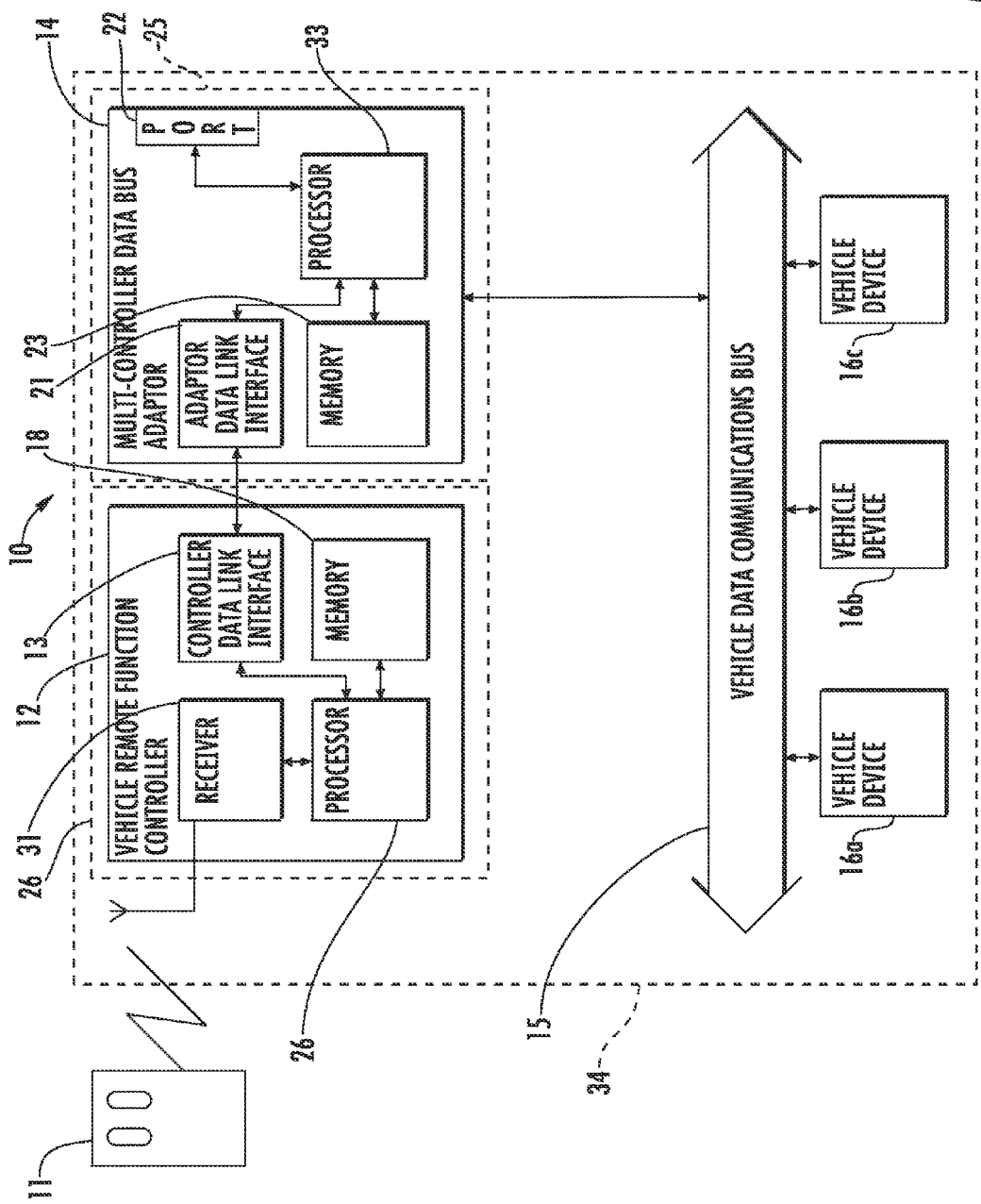
FIG. 1 is a block diagram of a vehicle remote control system in accordance with the present invention.

Referring initially to FIG. 1, a remote control system 10 for a vehicle of a type illustratively includes a data communications bus 15 extending throughout the vehicle and connecting a plurality of vehicle devices 16a-16c within the vehicle 34. For example, such vehicle devices 16a-16c may be associated with starter motor relays, headlight relays, sirens, or one or more vehicle sensors. Those skilled in the art will recognize other vehicle devices that may be connected to the data bus 15.

The remote control system 10 illustratively includes a remote transmitter 11 and a vehicle remote function controller 12 being responsive to the remote transmitter. The remote transmitter 11 may be a small portable unit including a housing, function control switches carried by the housing, a battery within the housing, and the associated transmitter circuitry. This type of remote handheld transmitter is commonly used in conventional vehicle security systems, remote start systems, and remote keyless entry systems. The communications from the remote transmitter 11 to the vehicle remote controller 12 at the vehicle is typically a direct radio frequency link, that is, there is no intervening communications links. However, in other embodiments, the remote transmitter 11 may indirectly communicate with the vehicle remote controller 12 via other communications infrastructure, such as via satellite, or cellular communications, via the public switched telephone network (PSTN) and/or over the world wide web or Internet, as will be appreciated by those skilled in the art.

The remote transmitter 11 may also be a passive transponder type device, that takes power from an associated transponder reader as will be appreciated by those skilled in the art, and automatically transmits a signal to the reader. For example, the transponder may be of the type carried in conjunction with the vehicle keys, or may be embedded in the key as will be readily appreciated by those skilled in the art.

The remote transmitter 11 may also include one or more central station transmitters, such as may be provided by a satellite transmitter or cellular telephone transmitter, for example. Such a central station transmitter may also be connected to other communications infrastructure.

The vehicle remote function controller 12 includes a receiver 31 and a processor 32 coupled thereto. The processor 32 is coupled to a controller data link interface 13 that, in turn, is connected to the multi-controller data bus adaptor 14. A vehicle remote function controller memory 18 is also coupled to the processor 32. Although the vehicle remote function controller memory 18 is illustrated as a separate device, those skilled in the art will recognized that the memory may alternatively be embedded on the same integrated circuit as the processing circuitry of the vehicle remote function controller processor 32. The vehicle remote function controller 12 illustratively includes a first housing 26, as illustrated in FIG. 1, for example.

The multi-controller data bus adaptor 14 illustratively includes a second housing 25, and is for adapting the vehicle remote function controller 12 to communicate via the data communications bus 15. The multi-controller data bus adaptor 22 illustratively includes a multi-controller data bus adaptor processor 33 coupled between a data learning port 22 and an adaptor data link interface 21. The adaptor data link interface 21 is coupled to the multi-controller data bus adaptor processor 33 and cooperates therewith to perform communication with the controller data link interface 13. Communication between the controller data link interface 13 and the adaptor data link interface 21 may be a serial data communications link. The serial data communications link is often a proprietary digital link for each manufacturer of the vehicle remote function controller. The multi-controller data bus adaptor 14 is advantageously operable with a given set of controller codes for the vehicle remote function controller 12 from among a plurality of different sets of controller codes for a plurality of different vehicle function controllers to thereby provide compatibility with different manufacturers' vehicle remote function controllers.

In some embodiments, the desired set of controller codes is obtained via a download learning port 22 included within the multi-controller data bus adaptor 14, as illustrated in FIG. 1, for example. The download learning port 22 illustratively cooperates with the multi-controller data bus adaptor processor 33 for learning or having downloaded thereto the given set of controller codes. For example, the download learning port 22 may be coupled to a wired or wireless connection to allow learning of the controller codes via a laptop, the Internet, a cellular connection, or other approaches as will be appreciated by those skilled in the art.

Turning now to another advantageous feature of the system 10, the vehicle 34 may operate with a desired set of vehicle device codes from among a plurality of different sets of vehicle device codes for different vehicles. The vehicle device codes may be unique to each vehicle or vehicle manufacturer. Advantageously, the download learning port 22 may also be used to learn the desired set of vehicle device codes similar to learning the controller codes as will be appreciated by those skilled in the art.

Learned controller codes or vehicle device codes from among a plurality of different sets of vehicle device codes for vehicles can be stored in the multi-controller data bus adaptor memory 23 of the multi-controller data bus adaptor 14. The memory 23 may be a plug-in IC, a PROM chip, a removable FLASH memory, or any other memory, as will be appreciated by those skilled in the art. Although the multi-controller data bus adaptor memory 23 is illustrated as a separate device, those skilled in the art will recognized that the memory may alternately be embedded on the same integrated circuit as the processing circuitry of the multi-controller data bus adaptor processor 33.

In other embodiments, the processor 33 of the data bus adaptor 14 can determine the given set of controller codes based upon at least one controller code received from the vehicle function controller 12. For example, the processor 33 may compare a received controller code to those already stored in a look-up table to thereby identify the particular manufacturer and/or code set being used by the vehicle remote function controller 12. Alternatively, the communication from the vehicle remote function controller 12 may include some other identifying code, voltage level, or other protocol characteristic that permits the processor 33 to determine the proper code set. Similarly, the multi-controller data bus adaptor 14 may also determine a desired set of vehicle device codes from among a plurality of different sets of vehicle device codes for different vehicles based upon at least one code on the data communications bus 15.

Figure 2:
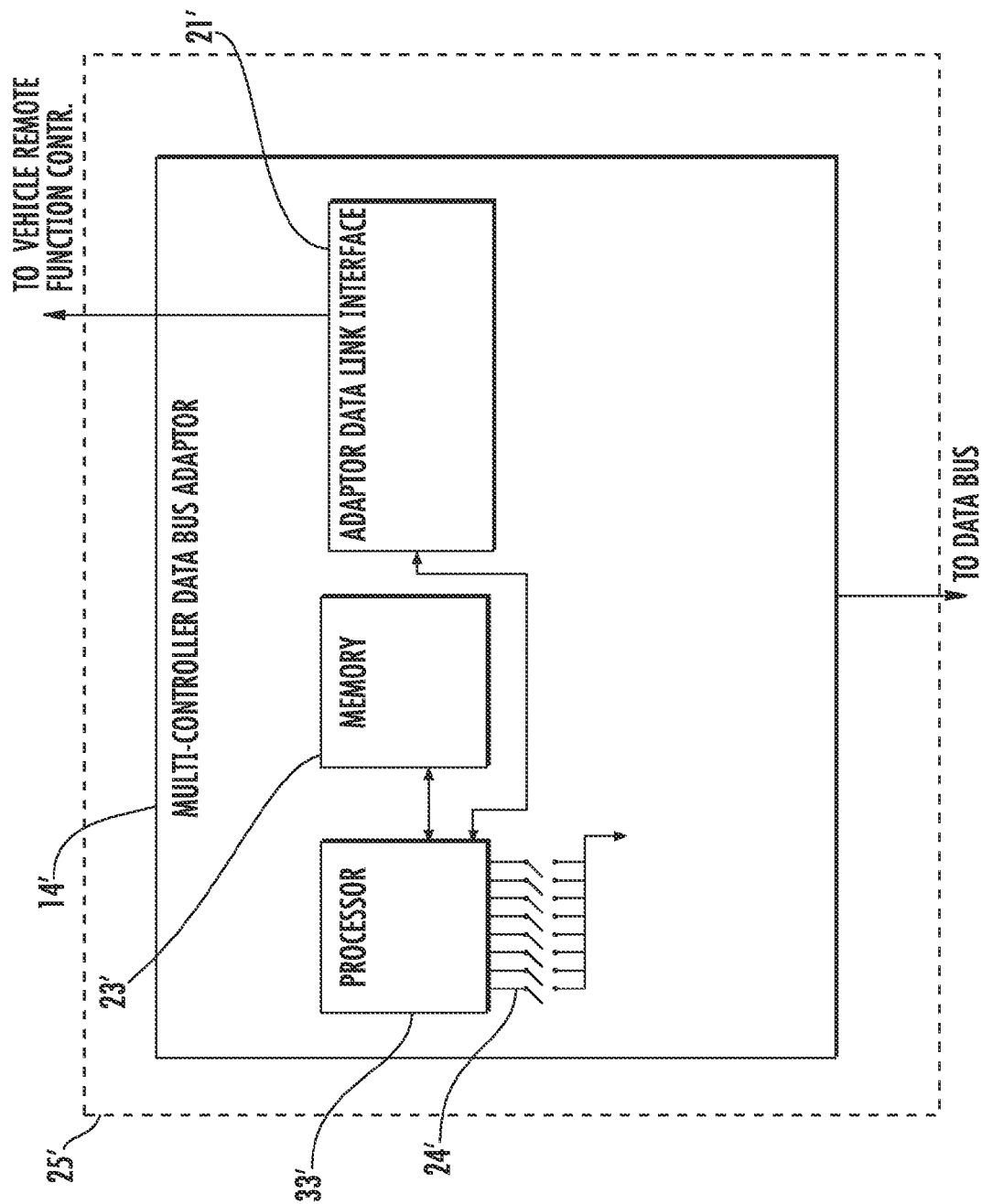
FIG. 2 is block diagram of another embodiment of a multicontroller data bus adaptor for a remote control system in accordance with the present invention.

In another embodiment, as illustrated in FIG. 2, for example, the multi-controller data bus adaptor 14' illustratively includes a plurality of switches 24' coupled to the multi-controller data bus adaptor processor 33'. The switches 24' permit the installer or user to select the given set of controller codes to be used by or selected from the multi-controller data bus adaptor memory 23. In addition, in some embodiments the switches 24' may also advantageously be used to select the desired set of vehicle device codes from among a plurality of different sets of vehicle device codes for different vehicles. Different controller and/or vehicle codes may be selected via the switches 24'.

In yet other embodiments, a given set of controller specific and/or vehicle specific codes may be stored on a removable multi-controller data bus adaptor memory 23. The removable memory may be separately programmed, either during manufacturing or installation, and then inserted into the multi-controller data bus adaptor 14.

Figure 3:
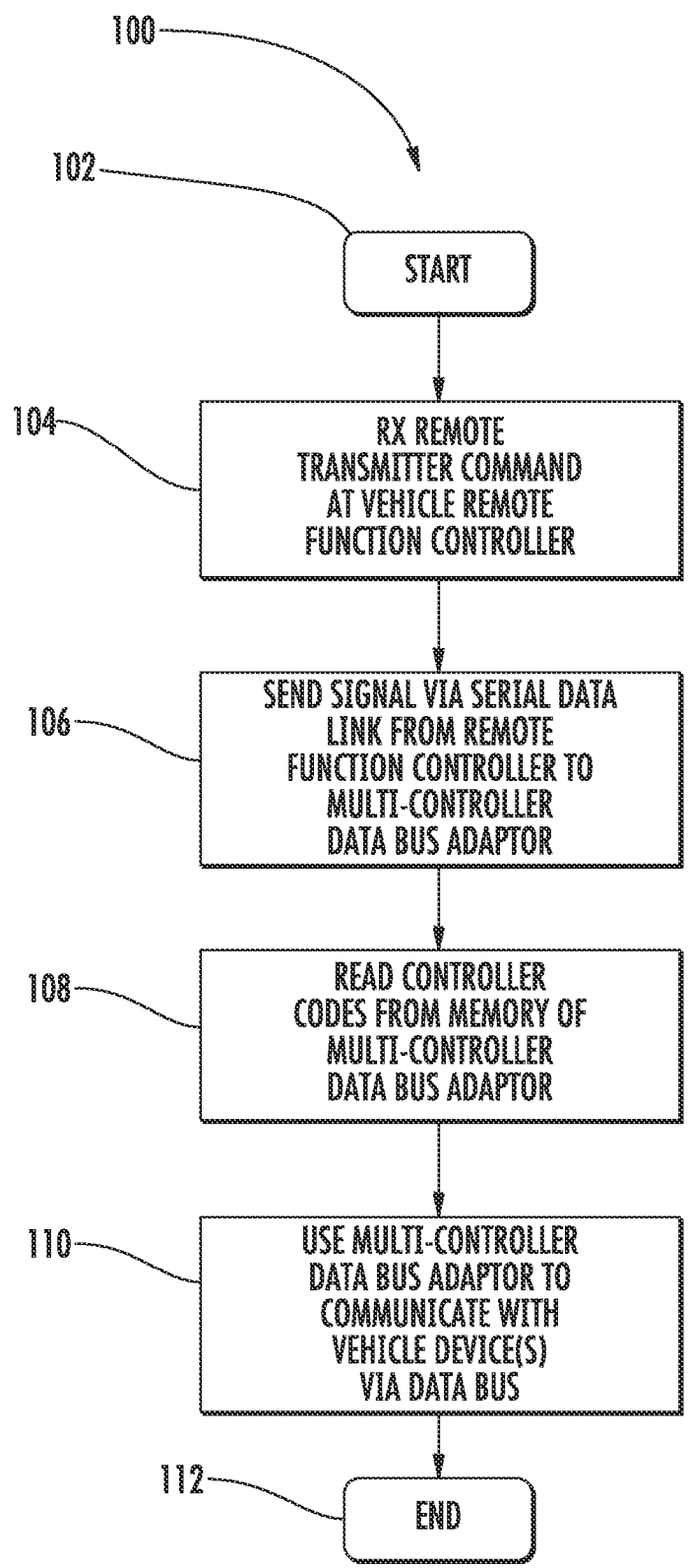
FIG. 3 is flowchart illustrating the operation of a remote control system in accordance with the present invention.

Turning now additionally to the flowchart 100 of FIG. 3, method aspects are described relating to operating the remote control system 10. After the start (Block 102), the vehicle remote function controller 12 receives commands from the remote transmitter 11 (Block 104). The vehicle function remote controller 12 sends one or more codes to the multi-controller data bus adaptor 14 via the serial data link at Block 106. Controller codes are read from the multi-controller data bus adaptor memory 23 at Block 108. Using the codes obtained from the multi-controller data bus adaptor memory 23, vehicle device codes are used to communicate with the vehicle devices 16*a-c* on the data bus 15 (Block 110).

Figure 4:
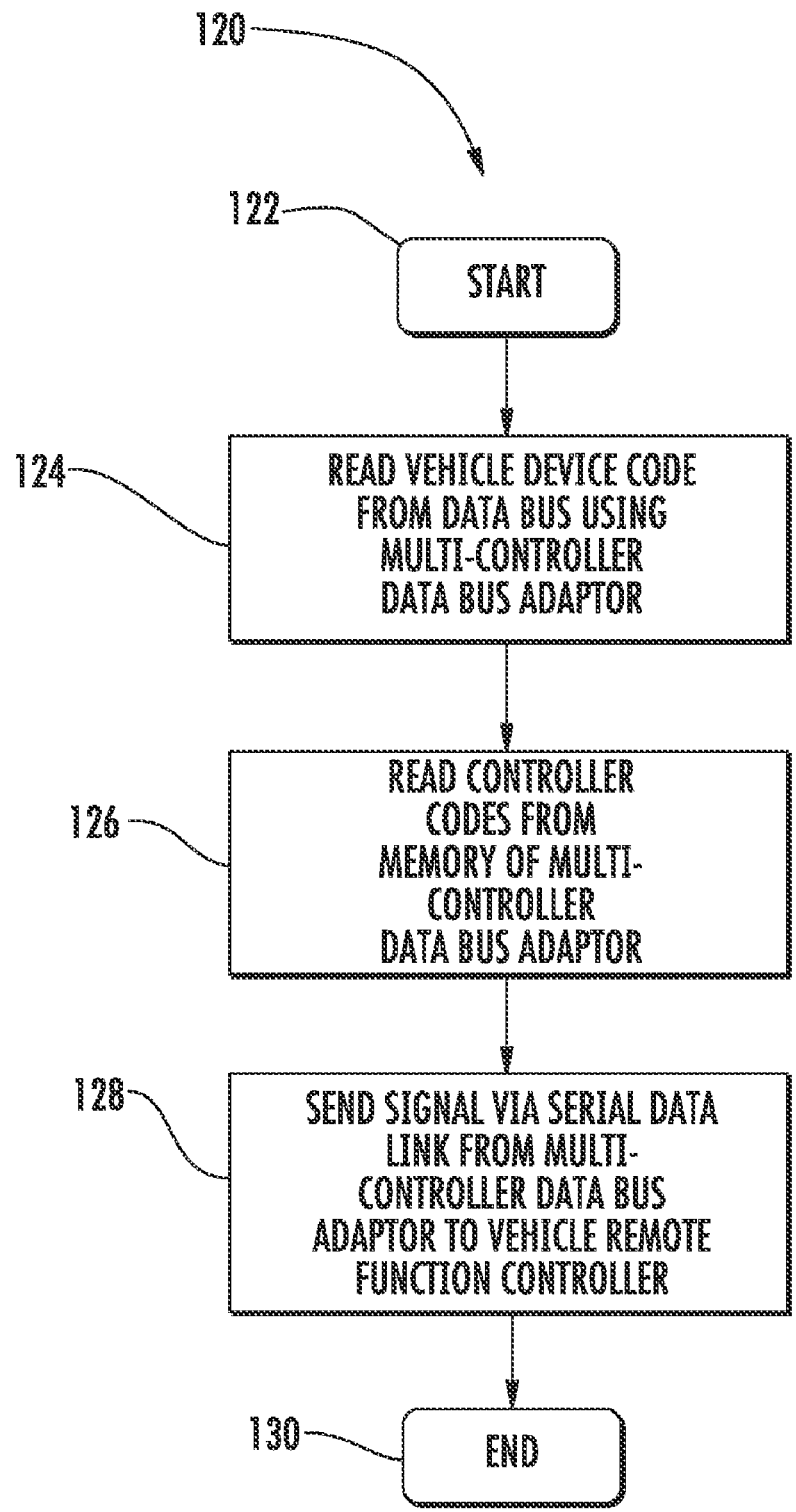
FIG. 4 is another flowchart illustrating the operation of a remote control system in accordance with the present invention.

Referring now to the flowchart 120 of FIG. 4, another method is now described. After the start at Block 122, vehicle device codes are read from the vehicle data bus 15 (Block 124). Based on the vehicle device codes, corresponding controller codes are read from the multi-controller data bus adaptor memory 23 of the multi-controller data bus adaptor 14 (Block 126). The controller codes are sent via the serial data link from the multi-controller data bus adaptor 14 to the vehicle remote function controller 12 (Block 128).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that, modifications and embodiments are intended to be included within the scope of the appended claims.

That which is claimed is:

1. A remote control system for a vehicle of a type including a data communications bus extending throughout the vehicle and connecting a plurality of vehicle devices within the vehicle, the vehicle operating with a desired set of vehicle device codes from among a plurality of different sets of vehicle device codes for different vehicles, the remote control system comprising:
   a remote transmitter;
   a vehicle remote function controller being responsive to said remote transmitter and comprising a controller data link interface; and
   a multi-controller data bus adaptor for adapting said vehicle remote function controller to communicate via the data communications bus and comprising an adaptor data link interface coupled to said controller data link interface;
   said multi-controller data bus adaptor operable with a given set of controller codes for said vehicle remote function controller from among a plurality of different sets of controller codes for a plurality of different vehicle function controllers, and comprising a download learning port for learning the given set of controller codes and the desired set of vehicle device codes.

2. The remote control system according to claim 1 wherein said multi-controller data bus adaptor further comprises a processor and a memory coupled thereto for storing the given set of controller codes.

3. The remote control system according to claim 2 wherein said memory is also for storing the desired set of vehicle device codes.

4. The remote control system according to claim 1 wherein said controller data link interface and said adaptor data link interface establish a serial data communications link therebetween.

5. The remote control system according to claim 1 wherein said vehicle remote function controller comprises a first housing; and wherein said multi-controller data bus adaptor comprises a second housing.

6. A multi-controller data bus adaptor for a remote control system comprising a remote transmitter, and a vehicle remote function controller being responsive to the remote transmitter and comprising a controller data link interface; the multi-controller data bus adaptor for adapting the vehicle remote function controller to communicate via a data communications bus extending throughout a vehicle, the vehicle operating with a desired set of vehicle device codes from among a plurality of different sets of vehicle device codes for different vehicles, the multi-controller data bus adaptor comprising:
 an adaptor data link interface to be coupled to the controller data link interface;
 a processor coupled to said adaptor data link interface and operable with a given set of controller codes for the vehicle remote function controller from among a plurality of different sets of controller codes for a plurality of different vehicle function controllers; and
 a download learning port for learning the given set of controller codes and the desired set of vehicle device codes.

7. The multi-controller data bus adaptor according to claim 6 further comprising a memory for storing the given set of controller codes.

8. The multi-controller data bus adaptor according to claim 6 wherein said adaptor data link interface establishes a serial data communications link.

9. A method for using a remote control system for a vehicle of a type including a data communications bus extending throughout the vehicle and connecting a plurality of vehicle devices within the vehicle, the vehicle operating with a desired set of vehicle device codes from among a plurality of different sets of vehicle device codes for different vehicles, the remote control system comprising a remote transmitter, a vehicle remote function controller being responsive to the remote transmitter and comprising a controller data link interface, and a multi-controller data bus adaptor for adapting the vehicle remote function controller to communicate via the data communications bus and comprising an adaptor data link interface coupled to the controller data link interface and a download learning port for learning a given set of controller codes for the vehicle remote function controller from among a plurality of different sets of controller codes for a plurality of different vehicle function controllers, and the desired set of vehicle device codes, the method comprising:
 operating the multi-controller data bus adaptor with the given set of controller codes and the desired set of vehicle device codes.

10. The method according to claim 9 wherein the data bus adaptor further comprises a processor and a memory coupled thereto for storing the given set of controller codes.

11. The method according to claim 9 wherein the controller data link interface and the adaptor data link interface establish a serial data communications link therebetween.

12. A multi-controller data bus adaptor for a remote control system comprising a remote transmitter, and a vehicle remote function controller being responsive to the remote transmitter and comprising a controller data link interface; the multi-controller data bus adaptor for adapting the vehicle remote function controller to communicate via a data communications bus extending throughout a vehicle and comprising:
 an adaptor data link interface to be coupled to the controller data link interface; and
 a processor coupled to said adaptor data link interface and operable with a given set of controller codes for the vehicle remote function controller from among a plurality of different sets of controller codes for a plurality of different vehicle function controllers, said processor determining the given set of controller codes based upon at least one code received from the vehicle function controller.

13. The multi-controller data bus adaptor according to claim 12 further comprising a memory for storing the given set of controller codes.

14. The multi-controller data bus adaptor according to claim 12 wherein said adaptor data link interface establishes a serial data communications link.

15. A method for using a remote control system for a vehicle of a type including a data communications bus extending throughout the vehicle and connecting a plurality of vehicle devices within the vehicle, the remote control system comprising a remote transmitter, a vehicle remote function controller being responsive to the remote transmitter and comprising a controller data link interface, and a multi-controller data bus adaptor for adapting the vehicle remote function controller to communicate via the data communications bus and comprising an adaptor data link interface coupled to the controller data link interface, the method comprising:
 operating the multi-controller data bus adaptor with a given set of controller codes for the vehicle remote function controller from among a plurality of different sets of controller codes for a plurality of different vehicle function controllers, the multi-controller data bus adaptor determining the given set of controller codes based upon at least one code received from the vehicle function controller.

16. The method according to claim 15 wherein the data bus adaptor further comprises a processor and a memory coupled thereto for storing the given set of controller codes.

17. The method according to claim 15 wherein the controller data link interface and the adaptor data link interface establish a serial data communications link therebetween.

* * * * *